United States Patent
Hara et al.

(10) Patent No.: US 9,350,238 B2
(45) Date of Patent: May 24, 2016

(54) POWER SUPPLY DEVICE FOR VEHICLE INCLUDING A BOOSTING CONVERTER CIRCUIT

(75) Inventors: Takashi Hara, Nagaokakyo (JP); Masashi Ikenari, Nagaokakyo (JP); Koichi Ueki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 13/090,287

(22) Filed: Apr. 20, 2011

(65) Prior Publication Data

US 2011/0193409 A1    Aug. 11, 2011

Related U.S. Application Data

(63) Continuation of application No. PCT/JP2009/061075, filed on Jun. 18, 2009.

(30) Foreign Application Priority Data

Nov. 4, 2008    (JP) .................................. 2008-283362

(51) Int. Cl.
*G05F 1/00* (2006.01)
*H02M 3/158* (2006.01)
(Continued)

(52) U.S. Cl.
CPC ............. *H02M 3/158* (2013.01); *H02J 7/1438* (2013.01); *H02M 1/32* (2013.01); *H02M 1/4225* (2013.01); *F02N 11/0814* (2013.01); *F02N 11/0862* (2013.01); *F02N 2250/02* (2013.01)

(58) Field of Classification Search
CPC ...... H05B 41/28; H02M 1/34; H02M 1/4208; H02M 1/44; H02M 3/158; H02M 1/4225; H02M 3/1588; H02M 3/32

USPC ....................... 323/282, 284, 290; 363/59, 60
See application file for complete search history.

(56) References Cited

U.S. PATENT DOCUMENTS 4,875,539 A * 10/1989 Abukawa et al. ............. 180/446
5,068,570 A    11/1991 Oda et al.
(Continued)

FOREIGN PATENT DOCUMENTS

JP    59-191886 U    12/1984
JP    02-197441 A    8/1990
(Continued)

OTHER PUBLICATIONS

Official Communication issued in International Patent Application No. PCT/JP2009/061075, mailed on Jul. 21, 2009.

*Primary Examiner* — Jeffrey Gblende
(74) *Attorney, Agent, or Firm* — Keating & Bennett, LLP

(57) ABSTRACT

A power supply device is provided for a vehicle having an idling-stop function, the power supply device including a boosting converter circuit with small loss that compensates for a voltage drop of a battery during starting of the engine and performing a protection function against a case in which the polarities of the battery are mistakenly connected in reverse. A series circuit including two MOSFETs serially connected to one another and an inductor is connected to the ends of a DC power source. A diode is connected to the connection point between the two MOSFETS serially connected to one another and the inductor, and a capacitor is connected in parallel to the two MOSFETS serially connected to one another. The two MOSFETs are serially connected such that the polarities of respective body diodes thereof are opposite to each other.

6 Claims, 9 Drawing Sheets

(51) Int. Cl.
  *H02M 1/42*     (2007.01)
  *H02J 7/14*     (2006.01)
  *H02M 1/32*     (2007.01)
  *F02N 11/08*    (2006.01)

(56) References Cited

U.S. PATENT DOCUMENTS

| | | | |
|---|---|---|---|
| 5,539,610 A | | 7/1996 | Williams et al. |
| 5,654,859 A | * | 8/1997 | Shi .................................. 361/66 |
| 5,712,536 A | * | 1/1998 | Haas et al. ..................... 315/247 |
| 6,023,418 A | * | 2/2000 | Engira ............................ 363/63 |
| 2001/0054887 A1 | | 12/2001 | Baretich et al. |
| 2002/0047693 A1 | * | 4/2002 | Chang ........................... 323/222 |
| 2003/0178245 A1 | * | 9/2003 | Takagi ........................... 180/446 |
| 2004/0217747 A1 | * | 11/2004 | Ying et al. .................... 323/282 |
| 2004/0227539 A1 | | 11/2004 | Thiery |
| 2010/0052641 A1 | * | 3/2010 | Popescu et al. ............... 323/300 |

FOREIGN PATENT DOCUMENTS

| | | | |
|---|---|---|---|
| JP | 07-184318 A | | 7/1995 |
| JP | 11-146558 A | | 5/1999 |
| JP | 11146558 A | * | 5/1999 |
| JP | 3022861 B1 | | 3/2000 |
| JP | 2000-166243 A | | 6/2000 |
| JP | 2005-137190 A | | 5/2005 |
| JP | 2005-237149 A | | 9/2005 |
| JP | 2006-020414 A | | 1/2006 |
| WO | 00/22296 A1 | | 4/2000 |

* cited by examiner

POWER SUPPLY DEVICE FOR VEHICLE INCLUDING A BOOSTING CONVERTER CIRCUIT

BACKGROUND OF THE INVENTION

1. Field of the Invention

The present invention relates to a power supply device for a vehicle, and more particularly, to a power supply device for a vehicle to be mounted in an idling-stop vehicle which temporarily stops the engine automatically when the vehicle comes to a stop, such as at a traffic light.

2. Description of the Related Art

In recent years, idling-stop vehicles that temporarily stop the engine automatically when the vehicles come to a stop, such as at a traffic light, have been used to reduce fuel consumption and emissions.

In a vehicle of this type, the engine is automatically stopped based on predetermined idling determination information such as the vehicle speed or the degree of opening of the accelerator when the vehicle is presumed to have stopped, and then automatically started by the starter in order to prepare the vehicle to start moving when an engine start condition indicating that the driver wants to start moving is satisfied.

In general, since the starter for starting an engine consumes a large amount of power, a phenomenon of a temporary drop in the voltage of a battery output system at the moment of starting the engine may occur.

Such a phenomenon becomes significant especially when a battery used as the power source is heavily discharged due to street driving in which stopping and starting of movement are frequently repeated.

When such a voltage drop occurs, problems, such as resetting of microcomputers used in electrical equipment in the vehicle, thereby losing memory contents, such as contents that have been learned up to that time, or temporary dimming of the instrument lighting or other lighting, thereby severely impairing the quality feeling of the vehicle, may occur.

Therefore, a configuration has been disclosed in which a boosting circuit for voltage compensation is provided in an idling-stop vehicle in order to prevent a voltage drop in the battery output system during restarting of the engine, and the boosting circuit is operated during a period in which the starter is operating upon starting of the engine (see, for example, Japanese Unexamined Patent Application Publication No. 2005-237149).

In addition, since a battery can be replaced by the owner, there may be a possibility of the polarities thereof being erroneously connected. Therefore, a protection circuit that prevents current from flowing when a reverse connection is made has been disclosed in, for example, Japanese Unexamined Patent Application Publication No. 2-197441.

A method for forming a protection circuit that prevents current from flowing when the polarities of a battery are mistakenly connected in reverse in a circuit that compensates, by using a boosting converter, for an output voltage drop due to a large power consumption of the starter during restarting of the engine as described above will be explained with reference to FIGS. 7 and 8.

FIG. 7 illustrates a configuration including a battery 1 provided as a DC power source, a first load 6, a first capacitor 2, a boosting converter circuit 3, a control circuit 4 which controls the boosting converter circuit 3 and a connector 5 to which the output voltage of the boosting converter circuit 3 is supplied, wherein the connecter 5 is connected to a second load (not shown).

The first load 6 includes a starter 61, an engine 62, and a generator 63. The starter 61 is supplied with DC voltage from the battery 1 during starting of the engine in order to start the engine 62. When the engine starts, power is generated by the generator 63 by using rotation as a power source in order to charge the battery 1.

The boosting converter circuit 3 includes an inductor 31, a first semiconductor switching element 32 defined by a field-effect transistor or other suitable semiconductor element, a first diode 34 and a second capacitor 35. The inductor 31 and the first semiconductor switching element 32 are connected in series to the ends of the battery 1. The anode of the first diode 34 is connected to the connection point between the inductor 31 and the first semiconductor switching element 32, and the cathode of the first diode 34 is connected to an output terminal of the connector 5. The second capacitor 35 is connected to the ends of the connector 5.

With automobiles, it is often the case that the battery 1 can be replaced by the user. Therefore, it is necessary to provide, in the power supply device for a vehicle, a protection circuit that prevents current from flowing in the reverse direction when the user mistakenly connects the polarities of the battery 1 in reverse. In order to provide such a function, a relay switch 8 shown in FIG. 7 or a third diode 9 shown in FIG. 8, for example, may be used to enable conduction only when a forward current flows. However, there is a problem in that when the output current of the power supply device for a vehicle is extremely large, the forward power loss of the third diode 9 or the power consumption of the relay switch 8 becomes too large to ignore, which causes the battery life to be shortened.

In addition, since the vehicle weight is large for large vehicles that are equipped with power steering devices, a high power is required for a motor used in the power steering device, and therefore the size of the motor must be increased. In order to prevent such an increase, a voltage greater than the output voltage (12 V) of an existing lead acid battery may be required. However, even in this case, a large current flows, and the loss cannot be ignored in an existing power supply device using a diode or a relay switch.

SUMMARY OF THE INVENTION

To overcome the problems described above, a power supply device for a vehicle according to a preferred embodiment of the present invention preferably includes a boosting converter circuit connected to a DC power source, a voltage detection circuit arranged to detect an output voltage of the DC power source, and a control circuit arranged to drive the boosting converter circuit in accordance with the output voltage detected by the voltage detection circuit so as to set the output voltage to a predetermined value. In the boosting converter circuit, a series circuit including at least one inductor and two semiconductor switching elements serially connected to one another is preferably connected to the ends of the DC power source. The boosting converter circuit preferably includes at least one rectifying element connected to a connection point between the at least one inductor and the two semiconductor switching elements serially connected to one another. The boosting converter circuit preferably includes at least one capacitor connected in parallel to the two semiconductor switching elements serially connected to one another. The two semiconductor switching elements are preferably serially connected such that the polarities of respective body diodes thereof are opposite to each other.

In the power supply device for a vehicle, preferably, the control circuit controls the boosting converter circuit such that the output voltage of the boosting converter circuit becomes the output voltage of the DC power source when a load connected to the DC power source is in an overloaded state and the output voltage of the DC power source is transiently dropped.

In the power supply device for a vehicle, preferably, a load of the boosting converter circuit is a power steering device, and the control circuit controls the output voltage of the boosting converter circuit in accordance with rotation angle information of steering in the power steering device.

In the power supply device for a vehicle, preferably, both of the two semiconductor switching elements are N-channel MOSFETs, and drain terminals thereof or source terminals thereof are connected to each other.

In the power supply device for a vehicle, preferably, the semiconductor switching element on a low-voltage side of the two semiconductor switching elements is controlled by the control circuit and the semiconductor switching element on a high-voltage side is configured as a self-driven type element including a diode arranged to apply a bias voltage to a control terminal.

According to various preferred embodiments of the present invention, in the power supply device for a vehicle including the boosting converter circuit that compensates a voltage drop of the battery due to a transient increase in load and supplies a voltage higher than the battery supply voltage, a circuit that prevents current from flowing in the reverse direction when the polarities of the battery are mistakenly connected in reverse can be provided with a low loss.

In addition, a mechanical switch, such as a relay switch, is no longer required when two FET body diodes are arranged such that the polarities thereof are opposite to each other, such that spark generation and noise generation are prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
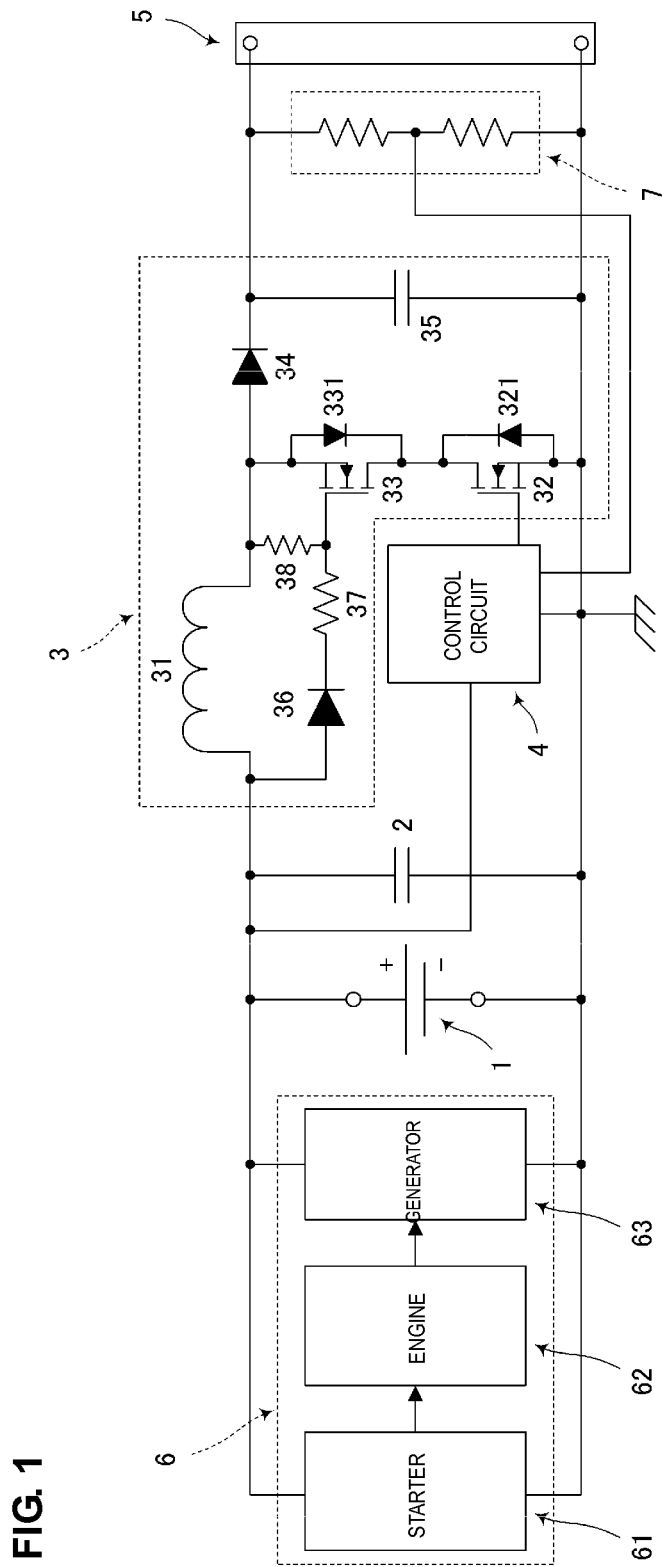
FIG. 1 is a circuit diagram illustrating a first preferred embodiment of the present invention.

Preferred embodiments of the present invention will be explained in detail with reference to the drawings. The same or similar components and elements are denoted by the same reference characters, and the explanation thereof will essentially not be repeated.

First Preferred Embodiment

FIG. 1 is a circuit diagram illustrating a configuration of a power supply device for a vehicle according to a first preferred embodiment of the present invention.

In FIG. 1, the power supply device for a vehicle preferably includes a battery 1 provided as a DC power source, a first load 6, a first capacitor 2, a boosting converter circuit 3, a control circuit 4 which controls the boosting converter circuit 3, and a connector 5 to which the output voltage of the boosting converter circuit 3 is supplied. A second load (not shown) is connected to the connecter 5.

The first load 6 preferably includes a starter 61, an engine 62, and a generator 63. The starter 61 is supplied with DC voltage from the battery 1 during starting of the engine in order to start the engine 62. When the engine starts, power is generated by the generator 63 by using rotation as a power source, and charges the battery 1.

The boosting converter circuit 3 preferably includes an inductor 31, a first semiconductor switching element 32, and a second semiconductor switching element 33 defined by a field-effect transistor (MOSFET) or other suitable semiconductor element, a first diode 34, a second capacitor 35, a second diode 36, a bias resistor 37, and a discharge resistor 38. The inductor 31, the second semiconductor switching element 33, and the first semiconductor switching element 32 are preferably connected in series to the ends of the battery 1. The drains of the first semiconductor switching element 32 and the second semiconductor switching element 33 are preferably connected such that the polarities of respective body diodes 321 and 331 are opposite to each other. Preferably, the anode of the first diode 34 is connected to the connection point between the inductor 31 and the second semiconductor switching element 33, and the cathode of the first diode 34 is connected to an output terminal of the connector 5. The second capacitor 35 is preferably connected to the ends of the connector 5.

The second diode 36 with the anode thereof connected to the connection point between the first capacitor 2 and the inductor 31 and the cathode thereof connected to the gate terminal of the second semiconductor switching element 33 via the bias resistor 37, and the discharge resistor 38 connected between the gate and the source of the second semiconductor switching element 33, are preferably provided. The control circuit 4 monitors an input voltage supplied from the battery 1 and an output voltage by using an output voltage detection circuit 7 to control on/off of the first semiconductor switching element 32 such that an output voltage to be supplied to the second load has a predetermined value.

When the load connected to the battery 1 (DC power source) is in an overloaded state and the voltage of the DC power source transiently drops, the control circuit 4 controls the boosting converter circuit 3 such that the output voltage of the boosting converter circuit 3 has the voltage of the DC power source.

Figure 2:
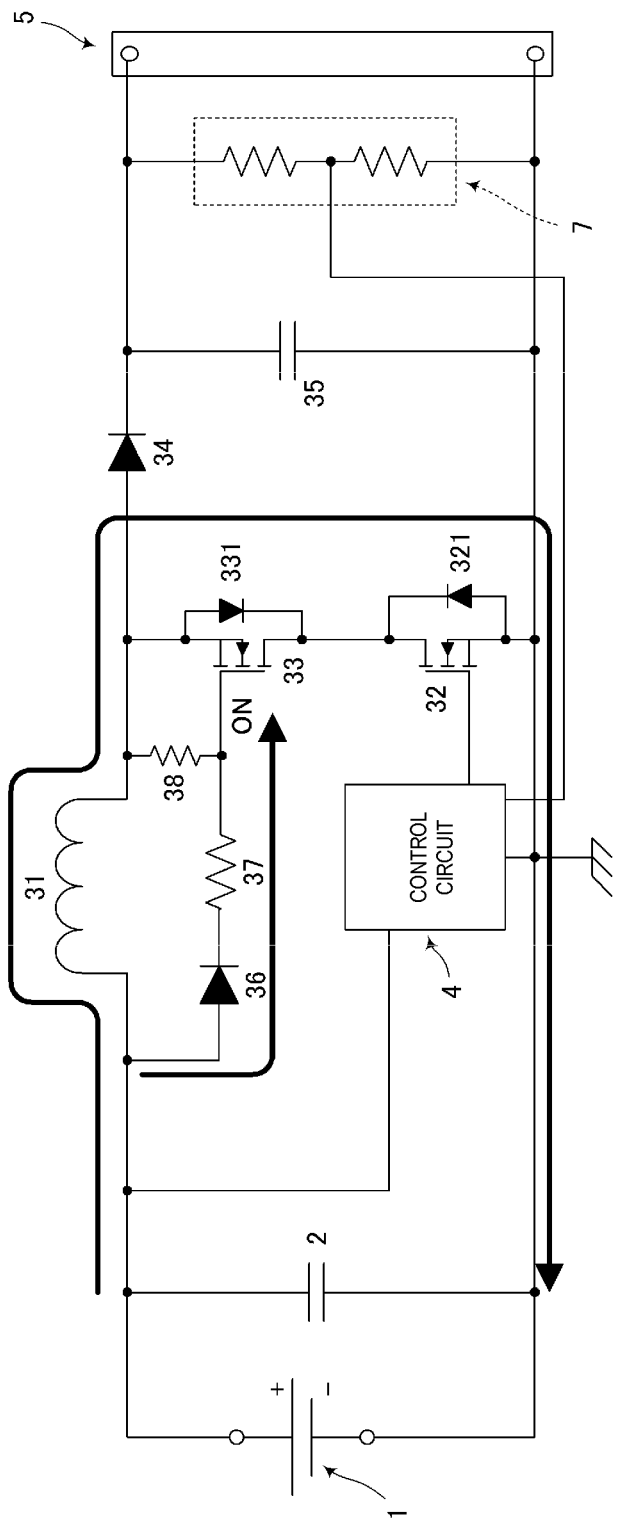
FIG. 2 is a circuit diagram showing a case in which a battery is correctly connected in the first preferred embodiment of the present invention.

FIG. 2 is a circuit block diagram showing a case in which the polarities of the battery 1 are correctly connected. The first load 6 including the starter 61, the engine 62, and generator 63 in FIG. 1 is not shown since the first load 6 has no direct role in the operation.

When DC voltage is supplied from the battery 1 and the control circuit 4 applies the voltage to the gate terminal of the first semiconductor switching element 32 to turn on the first semiconductor switching element 32, current flows in the inductor 31, thereby generating the voltage between the ends of the inductor 31. This turns on the second diode 36, and the voltage is applied to the gate terminal of the second semiconductor switching element 33 via the bias resistor 37, thereby also turning on the second semiconductor switching element 33. In this manner, a current flows in a closed loop from the positive terminal of the battery 1 to the inductor 31, the second semiconductor switching element 33, the first semiconductor switching element 32, and to the negative terminal of the battery 1.

Subsequently, when the first semiconductor switching element 32 is turned off by a control signal from the control circuit 4, energy accumulated in the inductor 31 during an ON period is released via the first diode 34 to charge the second capacitor 35. In this manner, a current flows in a closed loop from the positive terminal of the battery 1 to the inductor 31, the first diode 34, the second capacitor 35, and to the negative terminal of the battery 1.

Figure 3:
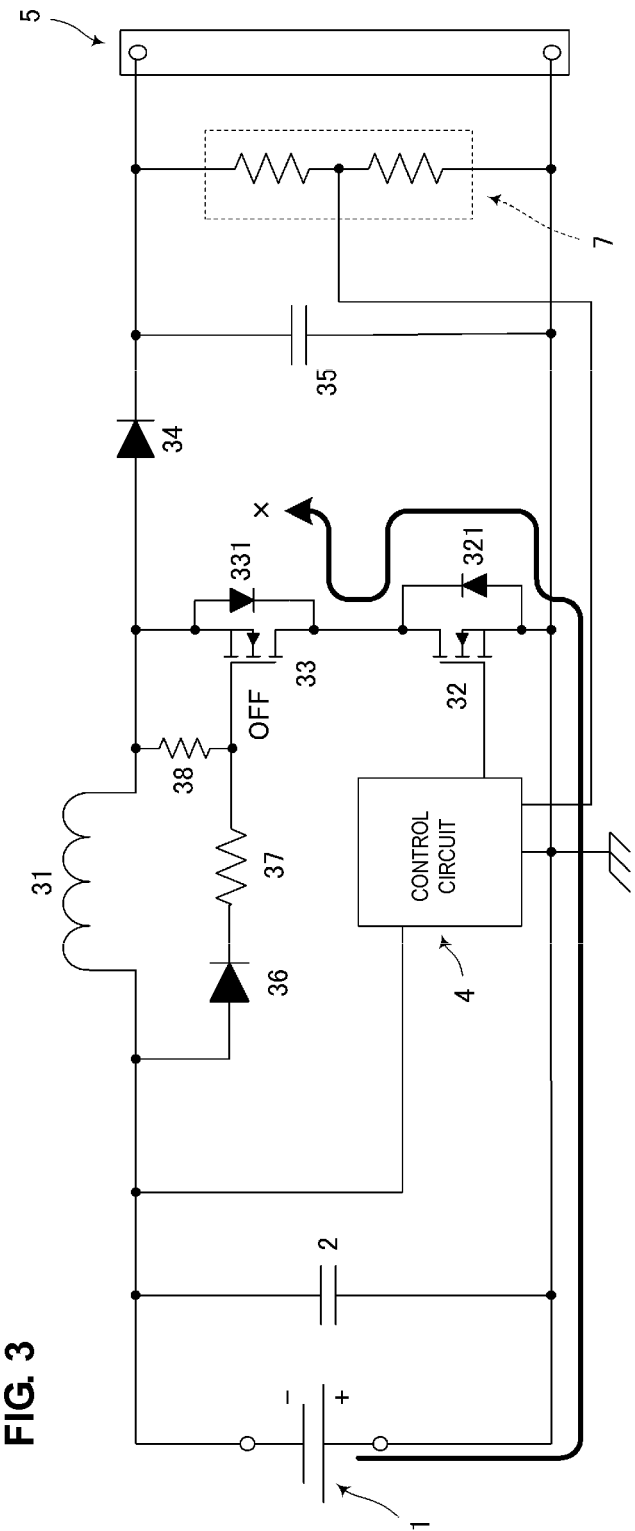
FIG. 3 is a circuit diagram showing a case in which a battery is reversely connected in the first preferred embodiment of the present invention.

Next, in FIG. 3, a case in which the polarities of the battery 1 are mistakenly connected in reverse is assumed. FIG. 3 is a circuit block diagram showing the case where the polarities of the battery 1 are connected in reverse.

When the battery 1 is reversely connected, the body diode 321 of the first semiconductor switching element 32 is biased in the forward direction, and thus is turned on. However, the body diode 331 of the second semiconductor switching element 33 is biased in the reverse direction, and thus is not turned on. That is, the two semiconductor switching elements (32 and 33) are used as a switch of the boosting converter circuit 3, and are serially connected such that the polarities of the body diodes (321 and 331) thereof are opposite to each other, whereby current can be prevented from flowing in the boosting converter circuit 3 when the polarities of the battery 1 are mistakenly connected in reverse. Consequently, damage and malfunction of the load connected to the output of the boosting converter circuit 3 are prevented.

In this case, the second semiconductor switching element 33 is preferably configured as a self-driven type element in which the second semiconductor switching element is not controlled by the control circuit 4 since the second diode 36 is present, and is always turned on when the battery 1 is correctly connected thereto and always turned off when the polarities of the battery 1 are mistakenly connected in reverse.

In addition, to compensate for a transient drop of the supply voltage of the battery 1 upon starting of the starter 61 as described above, the output voltage of the boosting converter circuit 3 may preferably be set so as to be equal or substantially equal to or greater than the supply voltage of the battery 1.

Figure 9:
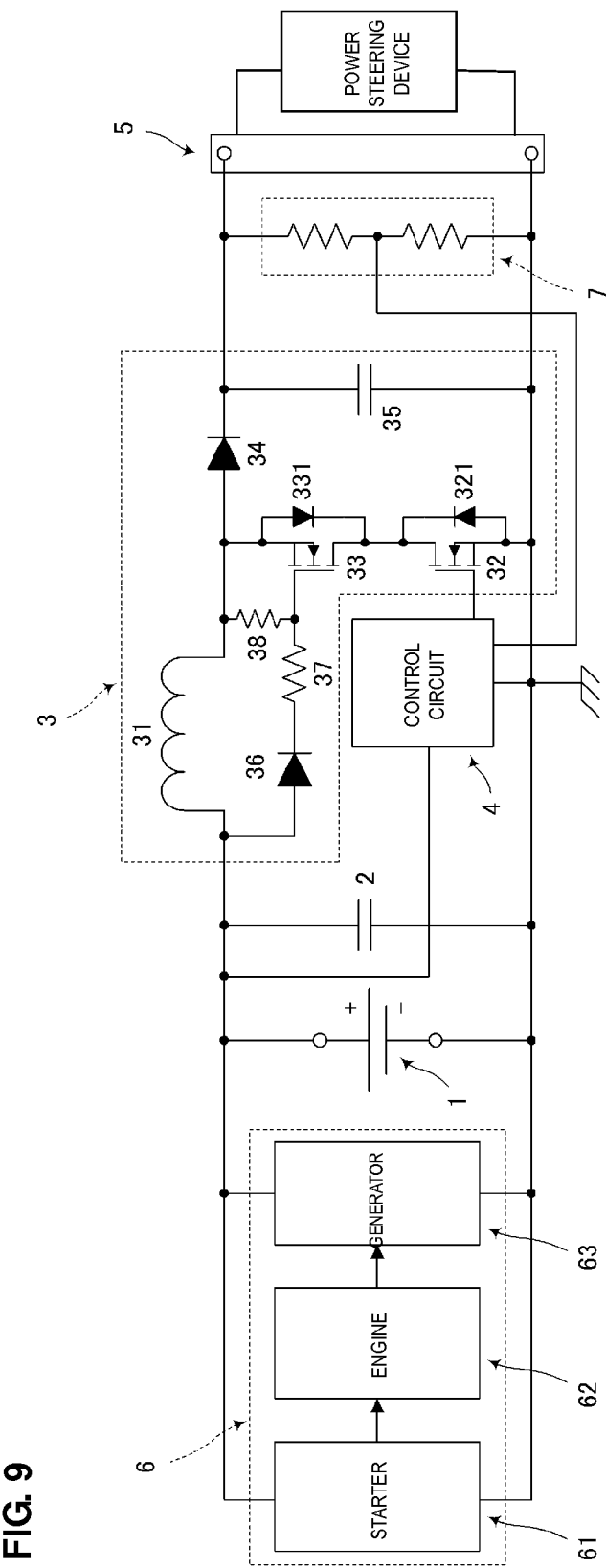
FIG. 9 is a circuit diagram illustrating a modification of the first preferred embodiment of the present invention.

Furthermore, as shown in FIG. 9, when the power supply device for a vehicle is used in the power steering device of a vehicle having a heavy vehicle weight, since stress is required to be controlled in accordance with the steering wheel angle that the driver has made, the control circuit 4 may preferably control, as appropriate, the output voltage of the boosting converter circuit 3 by receiving the steering rotation angle information from the second load.

Second Preferred Embodiment

Figure 4:
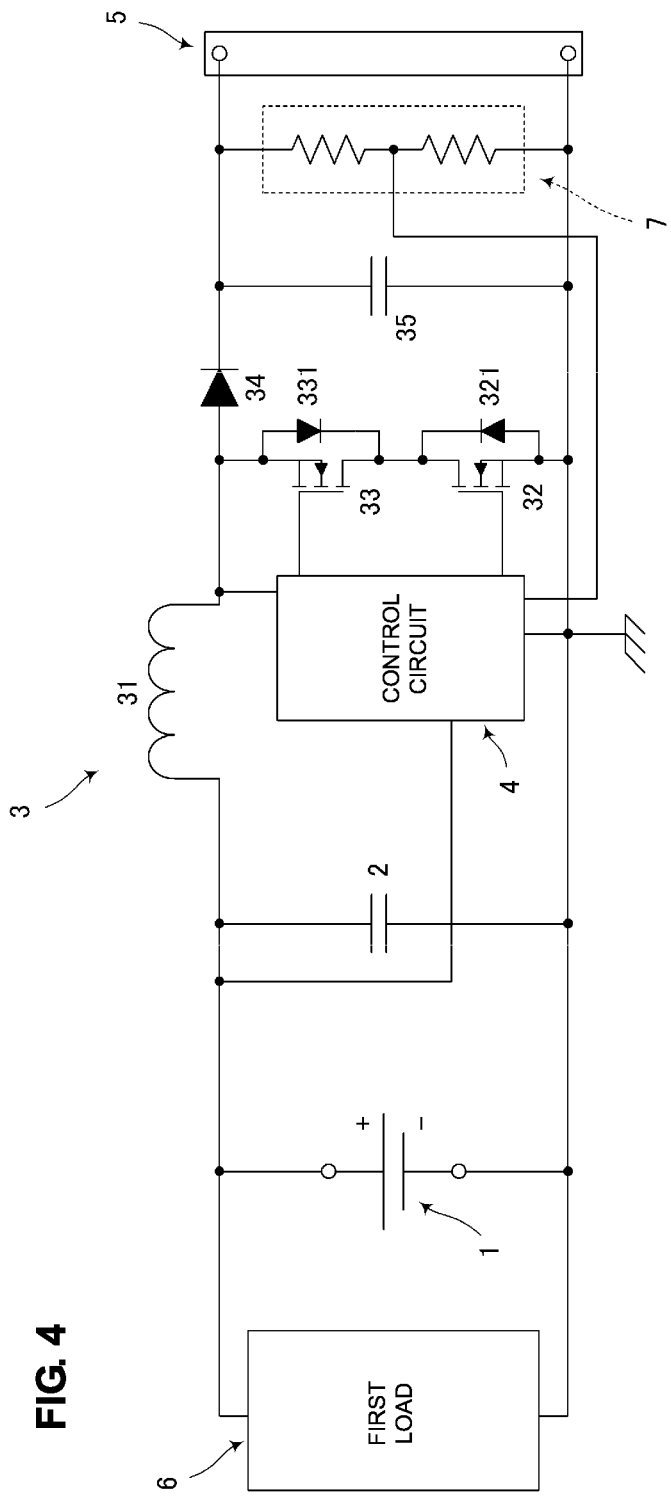
FIG. 4 is a circuit diagram illustrating a second preferred embodiment of the present invention.

FIG. 4 is a circuit diagram illustrating a configuration of a power supply device for a vehicle according to a second preferred embodiment of the present invention.

The second preferred embodiment differs from the first preferred embodiment in that the on/off control for the second semiconductor switching element 33 is preferably performed in the control circuit 4. When the control circuit 4 is configured so as to detect the voltage between the ends of the inductor 31, the control circuit 4 can perform the on/off control for the first semiconductor switching element 32 and the second semiconductor switching element 33.

Other features are substantially the same as in the first preferred embodiment, and explanations thereof are omitted.

Third Preferred Embodiment

Figure 5:
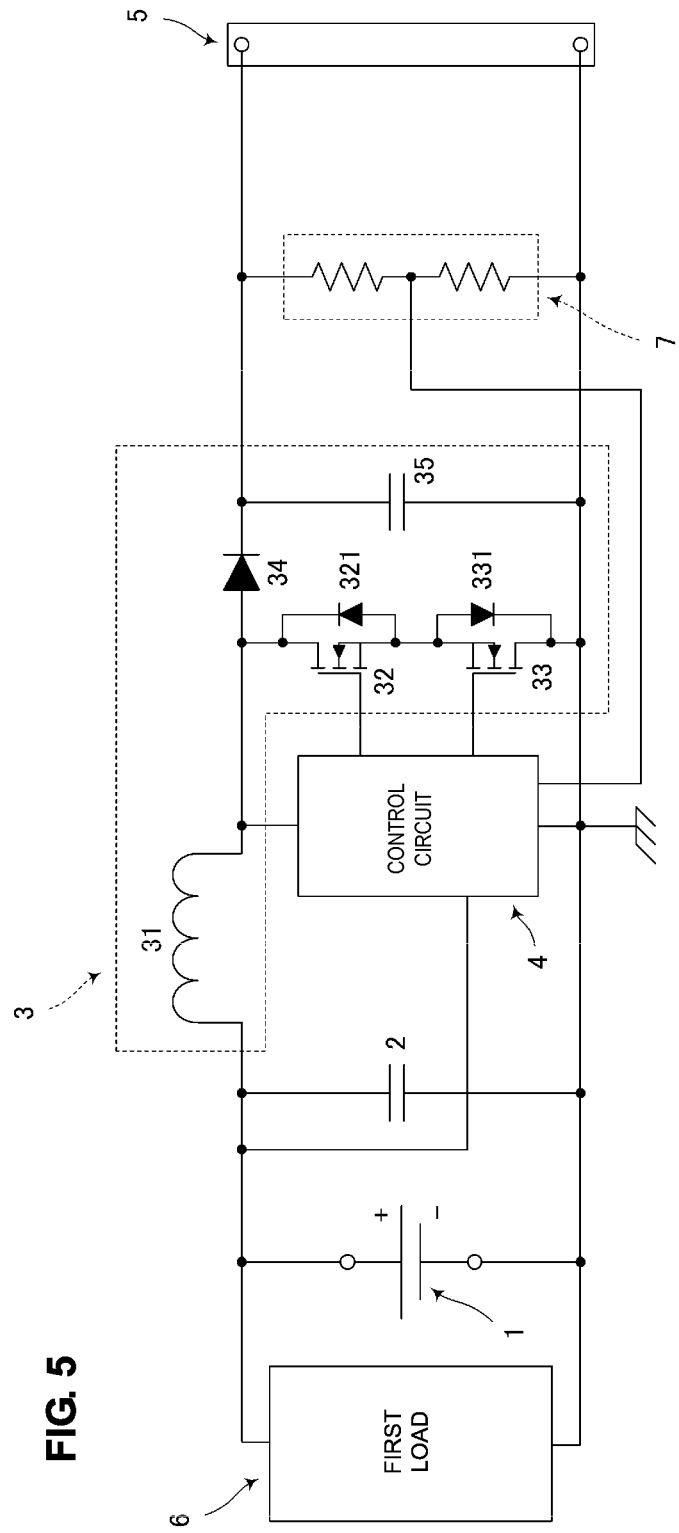
FIG. 5 is a circuit diagram illustrating a third preferred embodiment of the present invention.

FIG. 5 is a circuit diagram illustrating a configuration of a power supply device for a vehicle according to a third preferred embodiment of the present invention.

The third preferred embodiment differs from the second preferred embodiment in that the connection order of the first semiconductor switching element 32 and the second semiconductor switching element 33 is reversed. With a configuration in which the control circuit 4 performs the on/off control for the first semiconductor switching element 32 and the second semiconductor switching element 33, preferably, the first semiconductor switching element 32 may be disposed on the high-voltage side and the second semiconductor switching element 33 may be disposed on the low-voltage side, as shown in FIG. 5.

Other features are substantially the same as in the first preferred embodiment, and explanations thereof are omitted.

Fourth Preferred Embodiment

Figure 6:
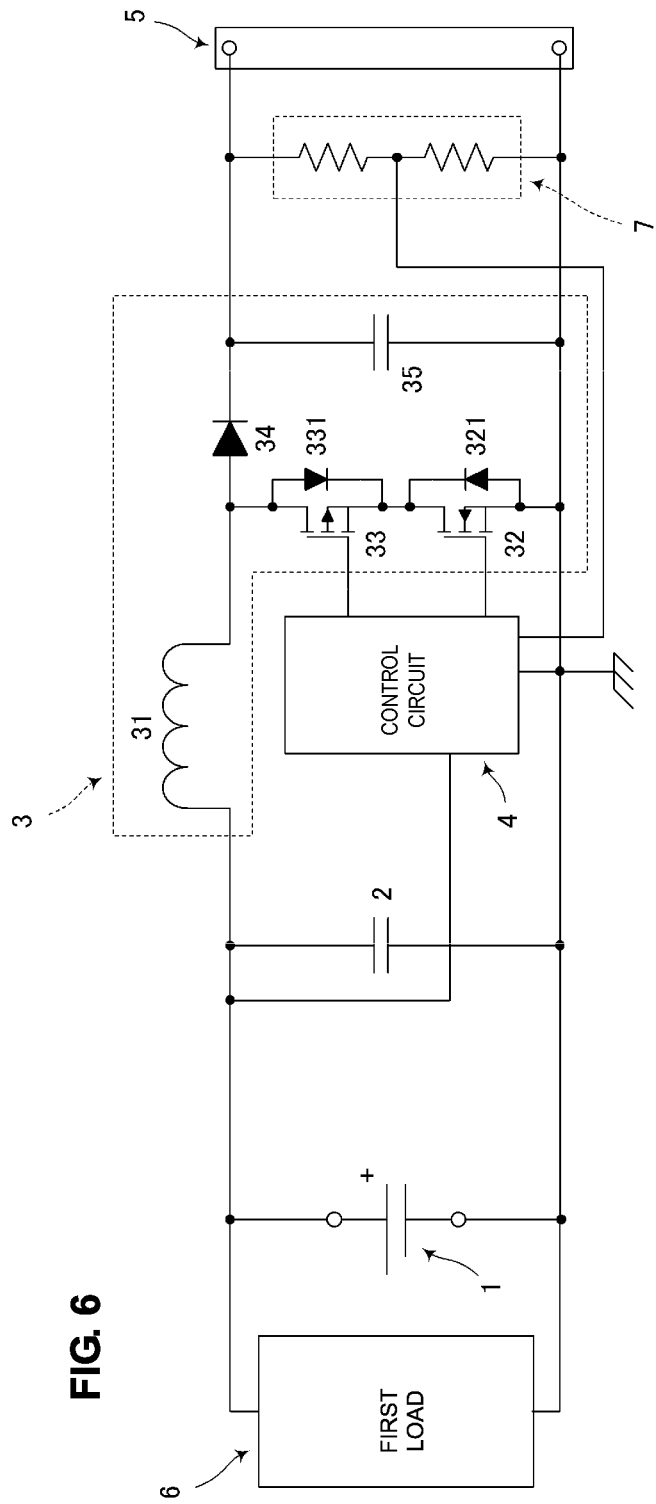
FIG. 6 is a circuit diagram illustrating a fourth preferred embodiment of the present invention.
Figure 7:
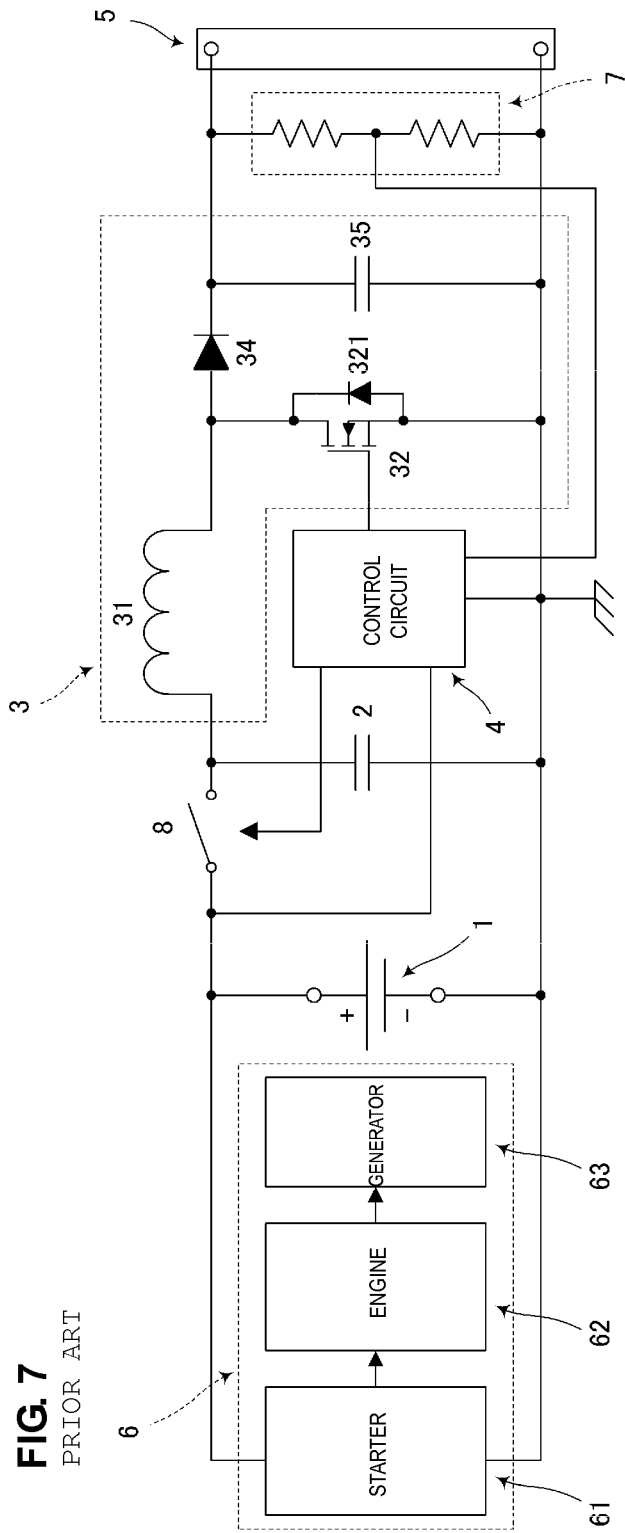
FIG. 7 is a circuit diagram of a power supply device for a vehicle for preventing reverse connection of a battery according to the related art.
Figure 8:
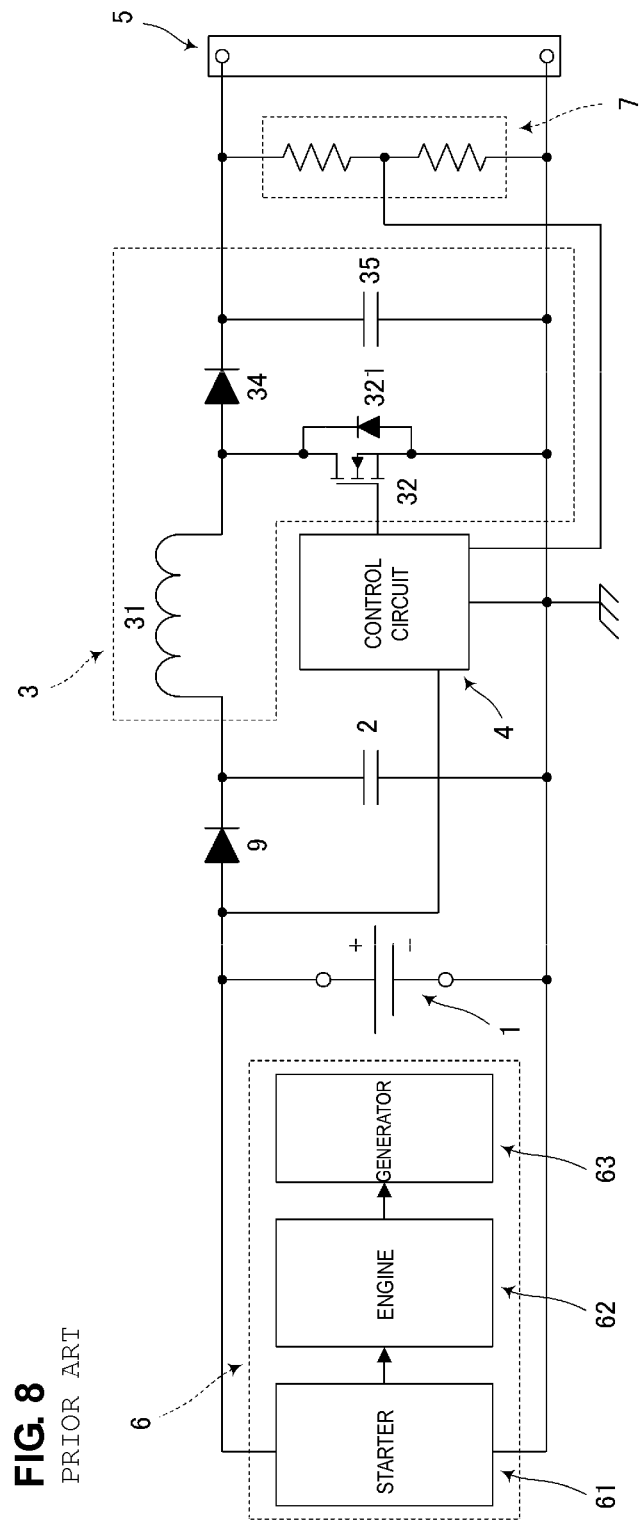
FIG. 8 is a circuit diagram of another power supply device for a vehicle for preventing reverse connection of a battery according to the related art.

FIG. 6 is a circuit diagram illustrating a configuration of a power supply device for a vehicle according to a fourth preferred embodiment of the present invention.

The fourth preferred embodiment differs from the second preferred embodiment in that the fourth preferred embodiment preferably includes a P-channel FET as the second semiconductor switching element 33 while the second preferred embodiment includes an N-channel FET as the second semiconductor switching element 33. With a configuration in which the control circuit 4 performs the on/off control for the first semiconductor switching element 32 and the second semiconductor switching element 33, the same operation can be achieved by configuring the power supply device such that a negative potential is applied to the gate terminal when a P-channel FET is used as the second semiconductor switching element 33.

Other features are substantially the same as in the first preferred embodiment, and explanations thereof are omitted.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A power supply device for a vehicle comprising:
a boosting converter circuit connected to a DC power source;
a voltage detection circuit arranged to detect an output voltage of the DC power source; and
a control circuit arranged to drive the boosting converter circuit in accordance with the output voltage detected by the voltage detection circuit to set the output voltage to a predetermined value; wherein
in the boosting converter circuit, a series circuit including at least one inductor and two semiconductor switching elements serially connected to one another is connected to a positive end and a negative end of the DC power source;
the boosting converter circuit includes at least one rectifying element connected to a connection point between the at least one inductor and the two semiconductor switching elements serially connected to one another;

the boosting converter circuit includes at least one capacitor connected in parallel to the two semiconductor switching elements serially connected to one another;

the two semiconductor switching elements are serially connected such that polarities of respective body diodes thereof are opposite to each other; and the boosting converter circuit and the control circuit are configured such that when polarities of the DC power source are correctly connected in the power supply device, the two semiconductor switching elements are turned on in order, and when the polarities of the DC power source are incorrectly connected in reverse in the power supply device, one of the two semiconductor switching elements is not turned on and current is prevented from flowing in the boosting converter circuit.

2. The power supply device for a vehicle according to claim 1, wherein the control circuit is arranged to control the boosting converter circuit such that the output voltage of the boosting converter circuit is substantially equal to a voltage of the DC power source when a load connected to the DC power source is in an overloaded state and the voltage of the DC power source is transiently dropped.

3. The power supply device for a vehicle according to claim 1, wherein a load of the boosting converter circuit is a power steering device, and the control circuit is arranged to control the output voltage of the boosting converter circuit in accordance with rotation angle information of steering in the power steering device.

4. The power supply device for a vehicle according to claim 1, wherein both of the two semiconductor switching elements are N-channel MOSFETs, and drain terminals thereof or source terminals thereof are connected to each other.

5. The power supply device for a vehicle according to claim 4, wherein the drain terminals of the two semiconductor switching elements are connected to each other, and the semiconductor switching element on a low-voltage side is controlled by the control circuit and the semiconductor switching element on a high-voltage side is a self-driven element having a diode arranged to apply a bias voltage to a control terminal.

6. The power supply device for a vehicle according to claim 1, wherein the DC power source is a battery.

* * * * *